United States Patent [19]

Jansson et al.

[11] 4,404,746

[45] * Sep. 20, 1983

[54] WIRE RETAINER AND DIAGONAL CUTTING NIPPER WITH WIRE RETAINER

[75] Inventors: Conny Jansson, Enköping; Lars Erlandsson; Rolf Appelkvist, both of Eskilstuna, all of Sweden

[73] Assignee: AB Bahco Verktyg, Enkoping, Sweden

[*] Notice: The portion of the term of this patent subsequent to Feb. 3, 1998, has been disclaimed.

[21] Appl. No.: 218,074

[22] Filed: Dec. 19, 1980

[51] Int. Cl.³ .............................................. B26B 17/00
[52] U.S. Cl. ........................................ 30/124; 30/135
[58] Field of Search .......................... 30/124, 134, 135

[56] References Cited

U.S. PATENT DOCUMENTS 2,323,497  7/1943  Strout .................................... 30/124
3,722,093  3/1973  Kaufman ............................... 30/124
3,763,560 10/1973  Makkay et al. ....................... 30/124
4,247,983  2/1981  Jansson et al. ........................ 30/124

Primary Examiner—Frank T. Yost
Attorney, Agent, or Firm—Oblon, Fisher, Spivak, McClelland & Maier

[57] ABSTRACT

A wire retainer, as well as a box joint nipper provided with such wire retainer, which is made from sheet metal and fittable to a side nipper of the kind consisting of two members crossing each other at a box joint portion, which are pivotably kept together by a hinge means and form the jaws and handles of the nipper. The wire retainer prevents offcuts from dropping when cutting and has an elastically yielding wire retainer tongue projecting out along one jaw of the nipper to retain the offcut between it and the opposite jaw. The wire retainer has an attachment portion from which the wire retainer tongue projects. The attachment portion comprises a plate with a hook on both side edges for removal and fitting to one of the members of the nipper in the region of the hinged portion.

4 Claims, 6 Drawing Figures

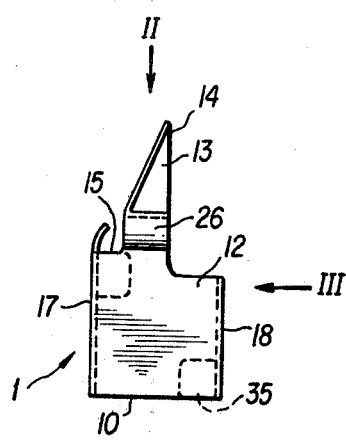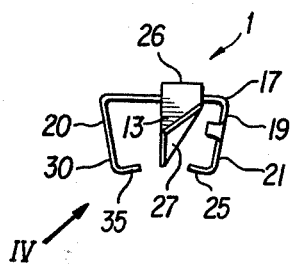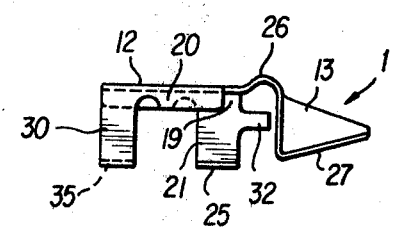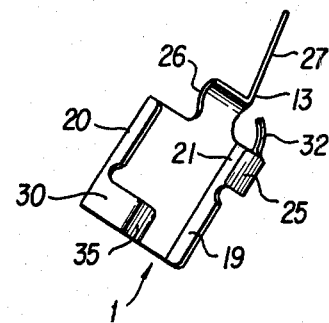

WIRE RETAINER AND DIAGONAL CUTTING NIPPER WITH WIRE RETAINER

BACKGROUND OF THE INVENTION

The invention relates to a wire retainer and a diagonal cutting nipper or box joint nipper with such a retainer, which is made from sheet metal and intended for attaching to a side nipper of the kind consisting of two members crossing each other at a hinge or joint portion, these members being pivotably kept together by a hinge means at the joint portion and forming jaws with cutting edges forwards of the joint portion of the nipper and arms rearwards of the joint portion thereof. Such a wire retainer, when fitted to one member of the box joint nipper, serves to prevent offcuts from dropping when cutting wire with the nipper. The retainer has a wire retaining tongue projecting out along one jaw of the nipper and adapted for coming into resilient yielding engagement against the edge of the second jaw when the jaws are closed, to retain a wire offcut between it and the second jaw until the jaws have been opened slightly. Box joint nippers of this kind are primarily used in producing electronics components and electronic equipment, as well as during servicing such equipment.

Previously known types of such wire retainers and box joint nippers provided with them are burdened with a troublesome disadvantage. These earlier retainers are adapted for being riveted or screwed to the nipper. A wire retaining tongue, irrespective of how well adapted it is, will always obscure some small part of the workpiece and can be an operational hinder, resulting in that a nipper without a retainer is preferably used where there is no danger of flying or falling wire offcuts causing any damage. In other cases, however, there is the risk that wire cutoffs could cause eye injuries, for example, or remain in the workpiece to cause functional disturbances later on, and with many items of electronic equipment having an important function from the point of view of safety, this could lead to personal injury as well as damage to material. As a safety measure it is therefore very often necessary to use a nipper with a wire retainer. In practice, this can to some extent have led to the unnecessary use of nippers provided with wire retainers which have been an operational hindrance, and perhaps such a nipper has not been used on some occasions where it would have been an advisable safety measure for preventing wire offcuts from coming into sensitive places. This would have been for the same reason in both cases, i.e. that only one nipper was available, and that it was too troublesome either to remove the wire retainer or to attach one.

SUMMARY OF THE INVENTION

The object of the invention is therefore to provide a wire retainer which can easily and quickly be attached to the nipper, and just as easily and quickly removed, and which is formed such that when fitted to the nipper it was obscure the workpiece as little as possible.

A further object is thus to provide a nipper with a wire retainer such that the nipper is quickly and easily convertible for varying jobs.

These objects are attained by the wire retainer being formed with an attachment portion carrying the wire retaining tongue, said portion comprising a plate with front edge, rear edge and two side faces formed by flanges projecting in the same direction from the sides of the plate, a first flange being formed near the forward edge of the plate with a flap bent back at substantially 180°, so that it forms a hook, and a flap extending forward into a slot of the nippers, while the opposite second flange is formed with such a hook at the rear edge of the plate, the tongue consisting of a flap projecting from the forward edge of the plate with a rear portion joining the front edge of the plate and bent outwards from the front edge in a direction away from said both flanges, and bent backwards in a curve to merge into a forward portion extending forwards from the rearward portion in the form of a blade disposed obliquely in relation to the plate.

BRIEF DESCRIPTION OF THE DRAWINGS

A preferred embodiment of the invention is described in detail in the following with reference to the attached drawings, on which FIG. 1 is a plan of a wire retainer in accordance with the invention;

FIG. 2 is an end view seen from the front of the retainer i.e. in the direction of arrow II in FIG. 1;

FIG. 3 is a side view of the same wire retainer, seen from the direction of the arrow III in FIG. 1;

FIG. 4 is a view seen at an angle to the inner side of the wire retainer in accordance with the arrow IV in FIG. 2;

DETAILED DESCRIPTION OF THE PREFERRED EMBODIMENTS

Figure 5:
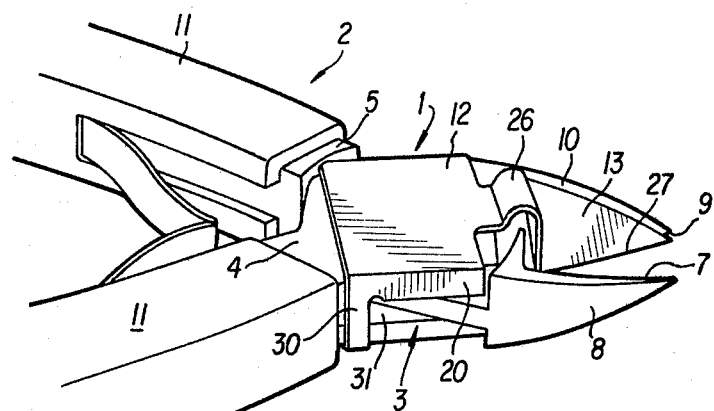
FIG. 5 is a partial view of the joint and jaw portions of a box joint nipper, with the wire retainer according to FIGS. 1–4 fitted to one member thereof.
Figure 6:
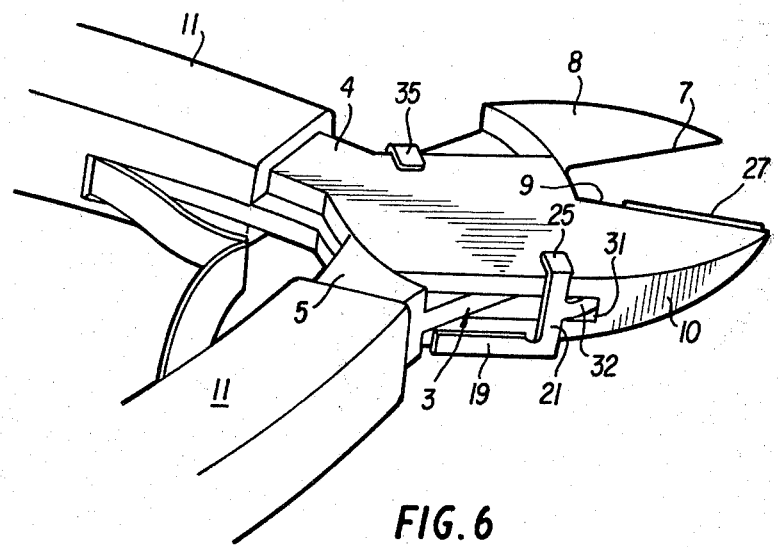
FIG. 6 is a similar view of the nipper of FIG. 5 although this view shows the underside of the joint and jaw portions of the side nipper.

The wire retainer 1 is made from sheet metal, preferably steel, and adapted for attaching to a box joint nipper 2 (FIGS. 5 and 6). The nipper is of the kind consisting of two members 4, 5 crossing each other at a box joint portion 3, said members being pivotably kept together by an internal hinge means at the box joint portion. Forwards of the joint portion, the members form jaws 8 and 10 provided with cutting edges 7 and 9, and rearwards of the joint portion they form arms for the grips 11, which are only partialy shown in FIGS. 5 and 6. Jaw 10 is partially bifurcated and form the box and a slot 31 through which jaw 8 passes, said hinge being located in the slot.

The retainer 1 is intended for fitting to one member 4 of the nipper 2, in the region of the joint portion 3, and serves to prevent wire offcuts from flying off when cutting wire with the nipper. With this object in view, the wire retainer comprises an attachment portion 12, and integral therewith a wire retaining tongue 13 projecting forwards from the attachment portion and which, when the nipper jaws are closed, comes into resilient yielding engagement with the jaw 8 on the opposite member, or more exactly, a wire retaining edge 14 on the tongue bears against the jaw 8 close to, and along the edge 9.

The attachment portion 12 comprises a plate with forward edge 15, rear edge 16 and two side faces 17, 18 formed by projecting flanges 19, 20 bent up in the same direction from the plate.

At the front edge 15 of the plate, the flange 19 is formed with a flap 21 which is bent at substantially 180°, while the opposite flange 20 is bent substantially at right angles to the plate and is formed with a flap 30 which is also bent at 180°. As will be seen from FIG. 6, the flap 21 goes over the thickness of the member 4 with an outer hook end 25 engaging against the side of the member 4 and facing inwards towards the member 5, in a region of the joint portion 3 on the member 4. The opposite flange 20 is oriented along the opposite edge of the joint portion of the member 4, as will be best seen from FIG. 5. The opposite flap 30 has an outer hook 35 similar to outer hook 25 of flap 21. A flap 32 extends forward from the flap 21 and fits within the slot 31.

The wire retaining tongue 13 comprises a flap projecting from the forward edge 15 of the attachment portion 12, said flap having a rear portion 26 joining said front edge and bent outwards from the front edge of the plate, after which it is bent forwards-inwards in a curve to merge into a forward portion 27. The forward portion extends forwards from the rear portion in the form of a blade which is oblique in relation to the plate and closely follows the configuration of a deep bevel on the jaw 10 of the member 4. This bevel, together with a complementary bevel on the jaw 8 of the member 5, forms a V-shaped recess in the upper side of the jaw portion when the jaws are closed. What is just described here is the usual depression at the jaw portion of diagonal cutting nippers, at the bottom of which the edges are situated at such a depth as to be in a lower jaw limiting surface common to both jaws and which is either slightly curved or flat, seen from the underside of the nipper. The blade-like skewed forward portion 27 of the wire retaining tongue 13 is provided with the wire retaining edge 14, already mentioned.

The function of the side nipper 2 provided with the wire retainer 1 is now obvious. When cutting a wire (not shown), the resulting offcut, seen in accordance with FIG. 5, is situated above the cutting point determined by the edges 7 and 9. When the jaws are moved towards each other, the offcut will then be kept between the retainer edge 14 and the jaw 8, closely adjacent to the edge 9, since the retaining tongue 13 is yieldingly pressed against the jaw 8 but now comes against the offcut lying between. The offcut is first released when the jaws are opened slightly.

The blade-shaped forward portion 27 of the retainer tongue 13, which closely adheres to the configuration of the jaw, only obscures the workpiece to a very small extent. When it is necessary to localize the cut very carefully, this minor hindrance to the view can also be easily removed, by removing the wire retainer 1 from the nipper.

The hook 25 and the hook 35 embrace the joint portion 3 of the box joint nippers when the wire retainer is fitted to the joint portion 3 by sliding over the jaws of the closed nippers. The flap 32 snaps into the slot 31 and maintains the position of the retainer. The retainer may be easily released and removed by lifting the flap 32 out of the slot 31 by means of, for example, a screwdriver.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letter Patent of the United States is:

1. A wire retainer made from sheet metal for attaching to a diagonal cutting nipper or box joint nipper of the kind consisting of two members crossing over each other at a box joint portion including a slot, and which are pivotably kept together by a hinge means at the joint portion to form jaws provided with cutting edges forwards of the joint portion, and nipper arms rearwards of the joint portion, the retainer serving to prevent offcuts from dropping during wire cutting with the nipper, when the retainer is fitted to a first one of the members of the nipper, the retainer comprising an attachment portion and a wire retainer tongue integral therewith, which projects outwardly form the attachment portion and is adapted to come into resilient yielding engagement against the jaw of a second one of the member when the jaws are closed, the attachment portion consisting of a plate with a front edge, a rear edge and two side faces formed by flanges upstanding in the same direction from the plate, a first flange being formed at the front edge of the plate with a first flap bent at substantially 180° to form a hook, while the opposing second flange is bent substantially at right angles to the plate and includes a second flap at the rear of the plate, said second flap being bent at substantially 180° to form a hook, the tongue comprising a flap projecting from the front edge of the plate, with a rear portion joined to the front edge of the plate and bent from said edge outwards in a direction away from said both flanges and bent over inwards in a curve to merge into a forward portion extending forwards from the rear portion in the form of a blade which is oblique in relation to the plate.

2. The wire retainer of claim 1 including a third flap extending forward from said first flap and adapted to be inserted into said slot.

3. A diagonal cutting nipper with a first and a second member crossing each other at a joint portion, which are pivotably kept together by a hinge means including a slot in the joint portion and forwards thereof form the jaws provided with cutting edges of the nipper, and rearwards thereof form both arms of the nipper, the edges being situated at the intersection between a substantially flat defining surface on the underside of the jaws and a defining surface on the upper side of the jaws in a depression which is formed by bevels in both jaws, a wire retainer made from sheet metal being attached to the first member of the nipper at the joint portion and adapted for preventing offcuts from dropping when cutting wire with the nipper, the retainer comprising an attachment portion and integral therewith a wire retainer tongue projecting forwards from the attachment portion along the jaw of the first member and extending laterally past the edge of this jaw towards the adjacent second jaw so that with closed jaws it resiliently and yieldingly engages with its wire retaining edge against and along the edge of the second jaw, the attachment portion comprising a plate with front edge, rear edge and side faces formed with bent-up flanges, said plate engaging against the first nipper member at the joint portion, said flanges gripping round the first member in the joint portion, extending along side edges thereof, with said flanges being formed with flaps bent inwardly at substantially 180° so that they form hooks, the outer end of which engages against the side of the first member facing inwards in a region of the joint portion on the first member outside, but closely adjacent the second member, whereby the retainer is removably slidable onto the nipper, the tongue comprising a flap projecting from the front edge of the plate and having a rear portion joining onto the front edge of the plate and from there being bent outwards from the plate and bent in a curve forwards-backwards to merge into a forward portion extending forwards from the rear portion in the form of a blade, which is oblique in relation to the plate, closely adheres to the form of said bevel in the jaw of the first member and is provided with said wire retaining edge.

4. The wire retainer of claim 3 including a third flap extending forward from said first flap and adapted to be inserted into said slot.

* * * * *